Nov. 29, 1927. 1,650,884
A. WESTGARD
SAW CONSTRUCTION
Filed Feb. 19, 1925
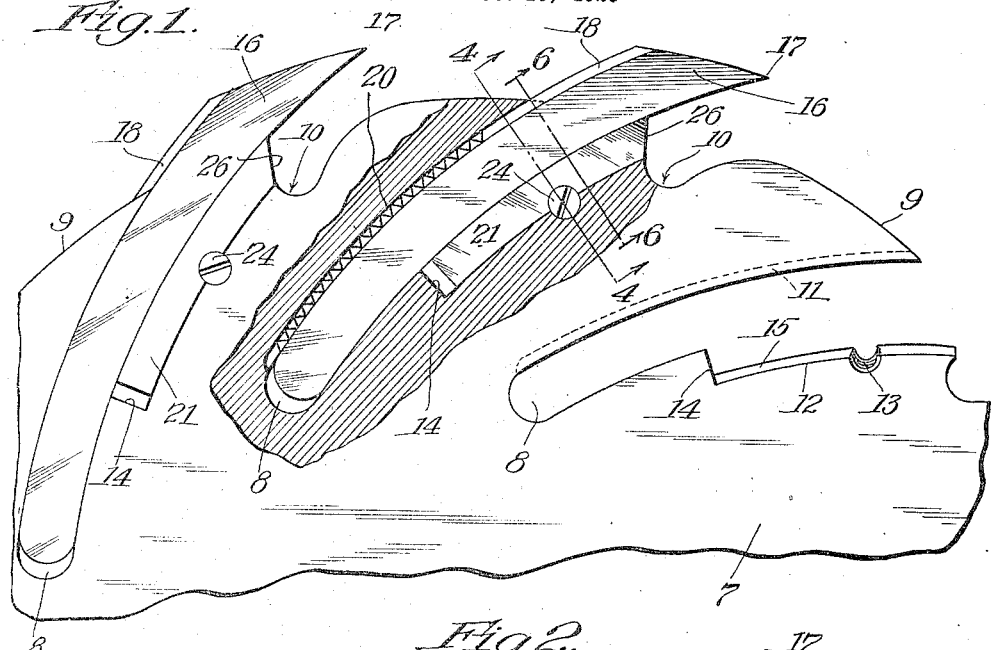
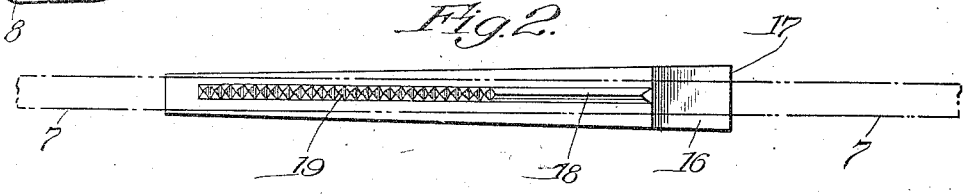
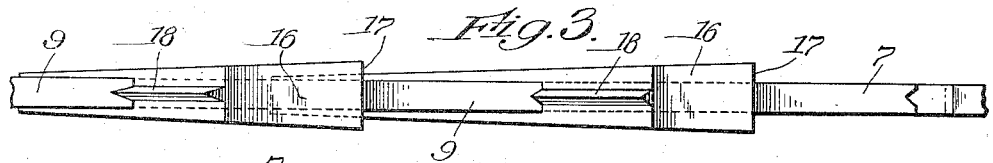
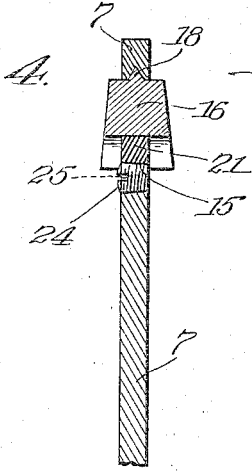
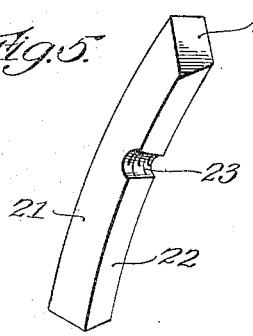
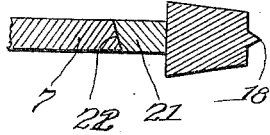
Inventor:
Anton Westgard
By Mason, Fenwick & Lawrence
Attys.

Patented Nov. 29, 1927.

1,650,884

UNITED STATES PATENT OFFICE.

ANTON WESTGARD, OF CHICAGO, ILLINOIS.

SAW CONSTRUCTION.

Application filed February 19, 1925. Serial No. 10,317.

The present invention relates particularly to an improvement in a saw having detachable teeth but it is also applicable to other tools having detachable working parts.

An object of the invention is to provide an improved saw in which the teeth will be tightly lodged against displacement whereby the durability of the saw will be increased. Another object is to provide an improved saw wherein the teeth thereof may be disposed to compensate for wear on the working parts and may be displaced and replaced rapidly when worn or damaged. Other objects and advantages will hereinafter appear.

Reference is had to the accompanying drawing forming a part of this specification, in order to demonstrate the preferred embodiments of the invention, in which:

Fig. 1 is a side elevation partly in section showing a circular saw blade with the teeth mounted therein.

Fig. 2 is an end view of one of the teeth in elevation and showing the saw in dotted lines.

Fig. 3 is a similar view but showing the teeth in position on the saw blade.

Fig. 4 is a sectional view taken on the line 4—4 of Fig. 1.

Fig. 5 is a perspective view of a locking member or plate used in connection with the device, and:

Fig. 6 is a sectional view taken on the line 6—6 of Fig. 1.

Referring to the drawings in detail, in which like reference characters designate corresponding parts throughout the several views, 7 designates a saw blade provided with a number of regularly arranged curved inwardly extending slots 8 adjacent to the front walls of which and communicating with the peripheral edge 9 thereof, the saw blade is cut away at 10 to provide shaving clearance. The back wall of each slot is provided with an elongated recess or cut away portion forming a groove 11 preferably of V-shaped cross-section centrally or approximately centrally of the thickness of the saw blade, as indicated in Fig. 3 of the drawings.

The front wall of the slot 8 is cut away at its outer major portion to form a recess 12, said recess communicating with the peripheral edge adjacent to the cut away portion 10 and provided with a semi-circular recess 13 in its wall and nearer its outer end than its inner end or shoulder 14. The wall of the recess 12 is inclined or beveled as indicated at 15 for a purpose to be hereinafter made apparent.

The tooth is designated at 16, the body of each tooth being curved to conform to the front and back walls of the slot 8 and is slightly wedge shaped but preferably about rectangular in cross-section. The tooth being substantially wedge shaped in plan the cutting edge or wide part 17 of the wedge constituting the cutting edge and the sides of the body being slightly beveled on both sides to provide rake or clearance as will be readily understood.

Extending centrally the length of the back surface of each tooth 16 is a V-shaped tongue or rib 18, the same extending the full length of the tooth but being smooth for part of the length of the tooth and the remaining part being provided with a series of serrations or teeth or ribs 19 preferably of triangular cross-section and tapered as shown with intervening notches, to engage corresponding serrations or teeth and notches in the edge wall of the recess or slot 8 as indicated at 20 so that the tooth may be placed in position and held in this position so adjusted until clamped, and in such a manner as to facilitate accurate adjustment and retention in this position until clamped or fastened. The front surface of the body of the tooth 16 is smooth, in lieu of being provided with serrations transversely thereof or teeth as is customary.

For locking the tooth in position within the slot or recess 8, an elongated locking member or curved plate 21 is provided, the same fitting in the supplementary recess 12 communicating with the slot or recess 8, as previously described, so that when the tooth 16 is in position in the slot 8, the plate 21 is placed in position to engage the front surface of the tooth body 16 with its beveled edge 22 co-acting with the beveled edge 15. While I have described these edges as being beveled, it is to be understood that they may be made substantially straight or normal to the opposite faces of the saw body or blade 7. The plate or locking member 21 is also provided with a semi-circular tapered threaded recess 23 co-acting with the semi-circular threaded recess 13 to provide a circular threaded opening for receiving a tapered screw threaded locking member or set screw 24, the tapered cross-section of which produces a tapered plug for wedging the locking member or plate 21 tightly against the front face or edge of the tooth body 16 when the set screw 24 is screwed home through the instrumentality of its head slot 25 by means of a suitable screwdriver, or other tool. The small end of the screw 24 may be upset or expanded by striking the same with a center punch to expand its metal into the threads of the body and locking member, if desired to retain the same in place. The forward edge of the locking member or plate 21, is beveled as indicated at 26 to conform to the cut out 10 provided for shaving clearance and therefore extends outwardly to back up the tooth 16 in line with its cutting edge. By this means, the tooth is securely held in position and may be accurately adjusted and firmly clamped when once adjusted so that it will not become displaced. Furthermore, the attachment means provided will enable the teeth when worn to be adjusted as long as there are co-acting teeth and notches 19 and 20, or removed and replaced quickly and economically. Obviously, by having the groove 11 and ribs 18, and the teeth and notches 19 and 20 made parallel to the opposite faces of the saw blade as illustrated, this will enable the cuts and the parts of the saw construction to be made similar, thereby facilitating quantity production and reducing the cost of manufacture. It will also be manifest that the teeth may be readily inserted and removed and that they may be extended outwardly or adjusted to compensate for wear as they wear off in use. Furthermore, the teeth will be held from lateral displacement no matter how severe the strain thereon and there is no danger of binding and friction with its resulting turning of the saw or its saw teeth. The use of a high speed steel in the detachable teeth, permits of long wear and genuinely improved cutting points, such teeth being hardened about one-half of their length from the cutting point or edge to permit of use so long as there is sufficient serrated or notched body portion to be engaged by corresponding portion of the back wall of the slot in the blade, as indicated at 19 and 20 respectively. Furthermore, this construction insures that the teeth will be held at the proper position to compensate for the strain on the cutting edges, namely, at the side opposing the cutting edges.

While the invention is shown in connection with a circular saw, it is to be understood that the same is equally applicable to a bandsaw or other straight edge saw and that the teeth need not necessarily be curved for the successful operation of the invention. Other changes in the form, shape and arrangement of the parts may be resorted to without departing from the spirit and scope of the invention.

Having thus described my invention, what I claim as new and desire to secure by Letters Patent of the United States is:

1. In a saw construction, a body provided with a recess to receive a saw tooth, a saw tooth engaged therein and provided on one edge with a bevelled rib near its outer portion and serrations forming teeth at its inner portion, the corresponding edge of the recess of the body being provided with similar serrations and receiving the rib thereof in a recess formed therein, said serrations being triangular in cross-section transversely of the rib and recess whereby the rib and recess snugly interfit and being relatively deep to positively hold the adjustment between the body and tooth, the body having a supplementary recess communicating with the first named recess, the adjacent edge surface of the tooth being smooth and unserrated in line with the cutting edge thereof, a locking plate engaged in the supplementary recess and contacting with the adjacent edge of the tooth, the body and locking plate having co-acting recesses, and means to secure the locking plate against displacement and force the same against the tooth.

2. In a saw construction, a body of circular form provided with a plurality of slots, each slot communicating with the peripheral edge and extending in a substantially tangential direction, a saw tooth engaged in each slot and provided on one edge throughout its length with a central rib considerably narrower than the tooth and of triangular cross-section tapering towards its free edge away from the tooth and the rib having transverse serrations of triangular outline in the length of the rib providing pyramidal projections extending outwardly from the tooth, the corresponding edge of the recess of the body being provided with similar serrations formed in a groove therein adapted to receive the rib and interlocking with the serrations and teeth of the tooth, the body having a supplementary beveled recess at the opposite side of the slot extending a short distance thereof, a curved beveled locking plate engaged in the supplementary recess and contacting with the adjacent edge of the tooth, the locking plate extending only partially of the length of the tooth and slot thereof, the body and locking plate having co-acting threaded recesses, and a tapered wedge screw threaded into said recesses.

In testimony whereof I affix my signature.

ANTON WESTGARD.